(No Model.)
J. W. BARBER.
CHECK ROW ATTACHMENT.
No. 362,924. Patented May 17, 1887.
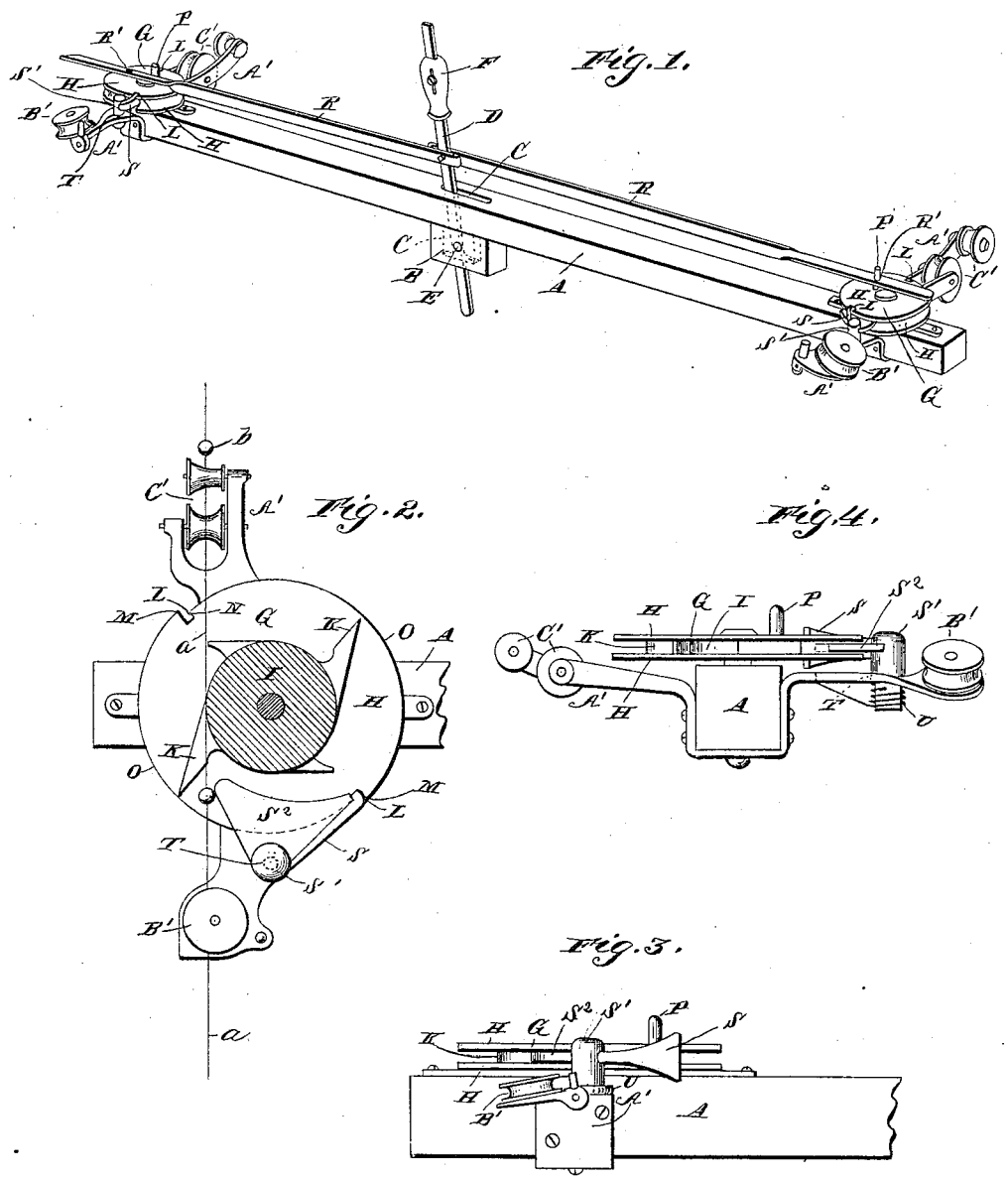
Witnesses
C. L. Taylor
J. W. Ganner
Inventor
Joshua W. Barber
By his Attorneys
C. A. Snowtles

UNITED STATES PATENT OFFICE.

JOSHUA W. BARBER, OF LARCHLAND, ILLINOIS.

CHECK-ROW ATTACHMENT.

SPECIFICATION forming part of Letters Patent No. 362,924, dated May 17, 1887.

Application filed January 22, 1887. Serial No. 225,165. (No model.)

*To all whom it may concern:*

Be it known that I, JOSHUA W. BARBER, a citizen of the United States, residing at Larchland, in the county of Warren and State of Illinois, have invented a new and useful Improvement in Check-Row Attachments, of which the following is a specification.

My invention relates to an improvement in check-row attachments for corn-planters; and it consists in the peculiar construction and combination of devices, that will be more fully set forth hereinafter, and particularly pointed out in the claims.

In the drawings, Figure 1 is a perspective view of a check-row attachment embodying my improvements. Fig. 2 is a top plan view of one end of the same, partly in horizontal section. Fig. 3 is an elevation of the same. Fig. 4 is a side elevation.

A represents a cross-bar, which is adapted to be attached to the corn-planter so as to extend transversely across the same, the length of the said cross-bar being in excess of the width of the corn-planter, so that the ends of the cross-bar will project beyond the sides of the planter a suitable distance.

The corn-planter is not shown in the accompanying drawings, for the reason that it may be of any preferred form, and forms no part of my present improvement.

From the under side of the cross-bar, at the center of the same, depends a block, B. A vertical opening, C, extends through the said block and through the cross-bar, and in the said opening is inserted the lower end of a lever, D, the said lever being fulcrumed in the block on a bolt, E, which passes through the same. The lower end of the lever projects a slight distance below the block and is adapted to be attached to the planting mechanism, and the upper end of the lever, which projects above the cross-bar, is provided with a weight, F, for the purpose to be hereinafter described.

On the upper side of the cross-bar, at each end thereof, is journaled an operating-wheel, G. The said wheels each consist of a pair of circular plates, H, arranged one above the other and separated a suitable distance, and are connected together by a central hub or web, I, having radial teeth or spurs K, which are bifurcated at their outer ends. On diametrically-opposite sides of the circular plates H are made notches or recesses L, which are provided on their rear sides with the broad projecting shoulders M and on their front sides with the slight offsets or shoulders N. The edges of the plates H, from the shoulders N to points midway between the notches L, are drawn on tangential curves O, as shown at Fig. 2. From the upper side of each operating-wheel G, and at a distance from the center thereof, projects a crank-pin, P.

R represents connecting-rods, which have their inner ends pivoted to the lever D at a suitable distance above the cross-bar, and are provided near their outer ends with openings R', adapted to receive the crank-pin, so as to connect the lever D to one of the operating-wheels, and thereby cause the said wheel, when it is rotated, to oscillate the lever D, and, through the latter, to actuate the seed mechanism.

A' represents bracket-arms, which are secured to the cross-bar near the outer ends thereof, and extend at right angles to the said cross-bar and project from the front and rear sides thereof. To the front ends of the said bracket arms are journaled guiding-sheaves B', the axes of which are vertical, and to the rear ends of the bracket-arms are journaled guiding-sheaves C', the axes of which are horizontal. The said guiding-sheaves are adapted to engage a check-wire, $a$, of the form commonly employed, and retain the same between the plates of the wheels G, so that as the machine advances the stops $b$ on the said check-wire will successively engage the spurs or teeth of the wheels G and rotate the latter.

S represents detents, which are provided with depending stems S', that are adapted to enter openings T, which are made in the rear arms of the brackets A' at a slight distance from the inner edges of the wheels G. These stems form the pivots upon which the detents turn.

U represents springs which are coiled around the lower ends of the stems S', the inner ends of the said springs being connected rigidly to the said stems, and the outer ends of the said springs are rigidly secured to the cross-bar, thereby causing the springs to exert a constant torsional strain on the pivotal stems, so as to cause the detents to normally bear against the edges of the wheels.

S² represents tappet-arms, which project from the inner sides of the detents toward the centers of the wheels G.

By reference to Fig. 2 it will be observed that when the detent is in engagement with one of the notches of an operating-wheel the outer side of the tappet-arm S² will be arranged at an angle with relation to the radial teeth or spurs K, so that the stops on the check-wire will be caused to come in contact with the tappet-arm and with a spur or tooth of the wheel, and thereby cause the detent to be tripped from the notch L to release the wheel, and the latter will then be turned through one-half a revolution by the check on the wire as the machine advances. As soon as the wheel has turned through one-half a revolution the spring-actuated detent will engage one of the notches L, and thus prevent the momentum acquired by the wheel from rotating the same any farther, and thereby cause the planting mechanism to cease to operate.

While one of the connecting-rods R is attached to the wheel G that is operated by the check-wire, the other connecting-rod will be detached from the opposite wheel G, as shown in Fig. 1. By having one of the wheels G at each end of the cross-bar and providing the connecting-rod for the lever, the machine may be operated by a check-wire arranged on either side thereof.

The function of the weight F at the upper end of the lever D is to cause considerable momentum to be imparted to the said lever when it is moved in either direction, so that the lever will move sufficiently far before coming to a stop to operate the seed-planting mechanism with maximum efficiency.

The operation of my invention will be very readily understood from the foregoing description and by reference to the accompanying drawings.

The weight F on the lever D is represented in the form of a handle with a slot in the middle to allow it to be set up or down on the lever by means of an adjusting-bolt. In this form the lever with the weight will better serve as a handle when the connecting-rods are detached for hand-planting.

Having thus described my invention, I claim—

1. In a check-rower for corn-planters, the combination of the notched operating-wheel having the projecting teeth or spurs to engage the checks on a wire or rope, a detent normally engaged with one of the notches in the said wheel, and a tappet-arm projecting from the detent and arranged in front of the teeth or spurs and the path of the check on the wire to be operated, in advance of the spurs over the wheel, to thereby release the detent from the latter, as and for the purpose described.

2. In a check-rower for corn-planters, the combination of an operating-wheel provided with notches in its periphery, and the projecting teeth or spurs adapted to be operated by the check-wire, a pivoted detent, a spring connected to the detent for normally pressing the same into one of the notches of the operating-wheel to lock the latter against rotation, and a tappet-arm fixed to the detent and projecting therefrom into the path of the protuberance on the check-wire, said tappet-arm being operated by the protuberance on the check to release the detent in advance of the projecting spurs or teeth of the wheel, as and for the purpose described.

3. In a check-rower for corn-planters, an operating-wheel comprising the parallel notched disks and the block clamped between the disks, and having the projecting teeth or spurs terminating at points within the peripheries of the disks, in combination with a detent having the pivotal stem, a coiled spring encircling the stem to control the detent and normally force the free end thereof into the notches of the operating-wheel, and a tappet-arm fixed to the detent and projecting outwardly therefrom between the disks of the wheel, said arm being arranged in advance of the teeth or spurs and in the path of the protuberance on the check-wire, as and for the purpose described.

4. The combination of a cross-bar having the fixed brackets at its outer end, and the guiding-sheaves journaled in the brackets, the operating-wheels G, journaled on the bar between the sheaves, and each wheel having the spurs or teeth to be engaged by the protuberances on a check-wire, the spring-actuated detents engaging the operating-wheels, and each having a tappet-arm affixed to the same, a pivoted lever, D, a weight fitted on the lever and adjustable longitudinally thereon, and the connecting-rods intermediate the operating-wheels and the lever, as and for the purpose set forth.

5. In a check-row attachment, the operating-wheels G, each comprising the pair of circular plates H, arranged one above the other, and the central hub or web arranged between the plates and having the radial teeth or spurs K, substantially as described.

6. In a check-row attachment, the combination of the operating-wheels G, comprising the circular plates H, having the peripheral notches L, and the central hubs or webs between the plates and having the radial spurs K, with the spring-actuated detents S, bearing normally on the peripheries of the operating-wheels and adapted to engage the notches L, the said detents having the tappet-arms S², projecting inward toward the spurs and between the plates H, substantially as described.

7. In a check-row attachment, the combination of the operating-wheels G, adapted to be rotated by the stops on the check-wire, the lever D, pivoted midway between the said wheels, the rods R, connected by crank-pins to the wheels G and detachably connected to the lever, whereby either rod may be disconnected from the latter, and the weight F, secured to the lever and adjustable thereon toward or from its fulcrum, for the purpose set forth, substantially as described.

8. The combination, in a check-rower for corn-planters, of the operating-wheels G, having the notches L, the detents S, to engage the said notches, and having the pivotal stems S', and the springs U, coiled on the said stems, the inner ends of the springs being attached to the stems and the outer ends of the springs being attached to a fixed point, for the purpose set forth, substantially as described.

9. The combination, in a check-rower for corn-planters, of the cross-bar A, having the bracket-arms A' at its outer end and provided with the guiding-sheaves, the operating-wheels G, journaled on the cross-bar and arranged between the guiding-sheaves, the said operating-wheels having the spurs or teeth adapted to be engaged by the checks on the wire, the spring-actuated detents to engage the wheels G, and having the tappet-arms $S^2$, for the purpose set forth, and the pivoted lever D, connected to the operating-wheels, substantially as described.

In testimony that I claim the foregoing as my own I have hereto affixed my signature in presence of two witnesses.

JOSHUA W. BARBER.

Witnesses:
L. O. TOURTELLOTT,
JOHN BROWN.